US010927015B2

(12) United States Patent
Friis et al.

(10) Patent No.: US 10,927,015 B2
(45) Date of Patent: Feb. 23, 2021

(54) METHOD AND APPARATUS FOR REMOVAL OF OXYGEN FROM SEAWATER

(71) Applicant: Minox Technology AS, Notodden (NO)

(72) Inventors: Tor Skovdal Friis, Notodden (NO); Ingvild Lindheim Sisjord, Ulefoss (NO)

(73) Assignee: Minox Technology AS, Notodden (NO)

( * ) Notice: Subject to any disclaimer, the term of this patent is extended or adjusted under 35 U.S.C. 154(b) by 150 days.

(21) Appl. No.: 16/080,582

(22) PCT Filed: Mar. 1, 2017

(86) PCT No.: PCT/NO2017/050055
§ 371 (c)(1),
(2) Date: Aug. 28, 2018

(87) PCT Pub. No.: WO2017/150985
PCT Pub. Date: Sep. 8, 2017

(65) Prior Publication Data
US 2019/0071324 A1   Mar. 7, 2019

(30) Foreign Application Priority Data
Mar. 2, 2016   (NO) .................................. 20160356

(51) Int. Cl.
*C02F 1/20*        (2006.01)
*B01D 19/00*       (2006.01)
(Continued)

(52) U.S. Cl.
CPC ............ *C02F 1/20* (2013.01); *B01D 19/0005* (2013.01); *B01D 19/0015* (2013.01); *C02F 1/02* (2013.01);
(Continued)

(58) Field of Classification Search
None
See application file for complete search history.

(56) References Cited

U.S. PATENT DOCUMENTS

| 4,017,276 A * | 4/1977 | Bloem ............... B01D 19/0005 95/258 |
| 4,565,634 A | 1/1986 | Lydersen |

(Continued)

FOREIGN PATENT DOCUMENTS

| EP | 327491 A1 | 8/1989 |
| EP | 391839 A1 | 10/1990 |

(Continued)

OTHER PUBLICATIONS

Christensson, Bengt, "International Search Report," prepared for PCT/NO2017/050055, dated Jun. 2, 2017, five pages.

(Continued)

*Primary Examiner* — Derek N Mueller
(74) *Attorney, Agent, or Firm* — Shackelford, Bowen, McKinley & Norton, LLP

(57) ABSTRACT

Method for removal of oxygen from seawater includes leading a stream of seawater and a pressurized stripping gas to a first mixer, mixing the seawater with stripping gas, leading the combined stream to a first gas/liquid inline separator, separating the stream into a liquid rich and a gas rich phase, leading the liquid stream and a stripping gas stream to a second mixer, mixing the liquid stream with the gas stream, leading the combined stream to a second stage inline separator, separating the combined stream into a liquid- and gas-rich phases, mixing the gas stream with a fresh water stream, leading this combined stream to a first stage scrubber, removing a portion of the salt entrained in the combined stream from the scrubber, and leading the salt depleted gas stream from the first scrubber via a heat (Continued)

exchanger or electrical preheater together with a fuel stream to a catalytic deoxidizer.

8 Claims, 1 Drawing Sheet

(51) Int. Cl.
*E21B 43/20* (2006.01)
*C02F 103/08* (2006.01)
*C02F 1/02* (2006.01)
*C02F 1/70* (2006.01)

(52) U.S. Cl.
CPC ............ *C02F 1/70* (2013.01); *C02F 2103/08* (2013.01); *C02F 2209/02* (2013.01); *C02F 2209/03* (2013.01); *C02F 2209/22* (2013.01); *E21B 43/20* (2013.01)

(56) References Cited

U.S. PATENT DOCUMENTS

| | | |
|---|---|---|
| 4,612,021 A | 9/1986 | Bland et al. |
| 4,752,306 A | 6/1988 | Henriksen |
| 4,937,004 A | 6/1990 | Mandrin et al. |
| 5,006,133 A | 4/1991 | Mandrin |
| 5,407,468 A | 4/1995 | Mandrin |
| 2012/0118154 A1 | 5/2012 | Wu et al. |
| 2015/0283481 A1 | 10/2015 | Akdim |

FOREIGN PATENT DOCUMENTS

| | | |
|---|---|---|
| EP | 458737 A2 | 11/1991 |
| GB | 2127711 A | 4/1984 |
| GB | 2202167 A | 9/1988 |
| NO | 158283 B | 5/1988 |
| NO | 20130670 A1 | 8/2013 |
| WO | WO-9922853 A1 | 5/1999 |
| WO | WO-2012065243 A1 | 5/2012 |

OTHER PUBLICATIONS

Minox Technology, "Effective and Chemical Free Deoxygenation of Water," published Sep. 10, 2014, URL: <https://www.youtube.com/watch?v=wDbAKf2CmdE>.

\* cited by examiner

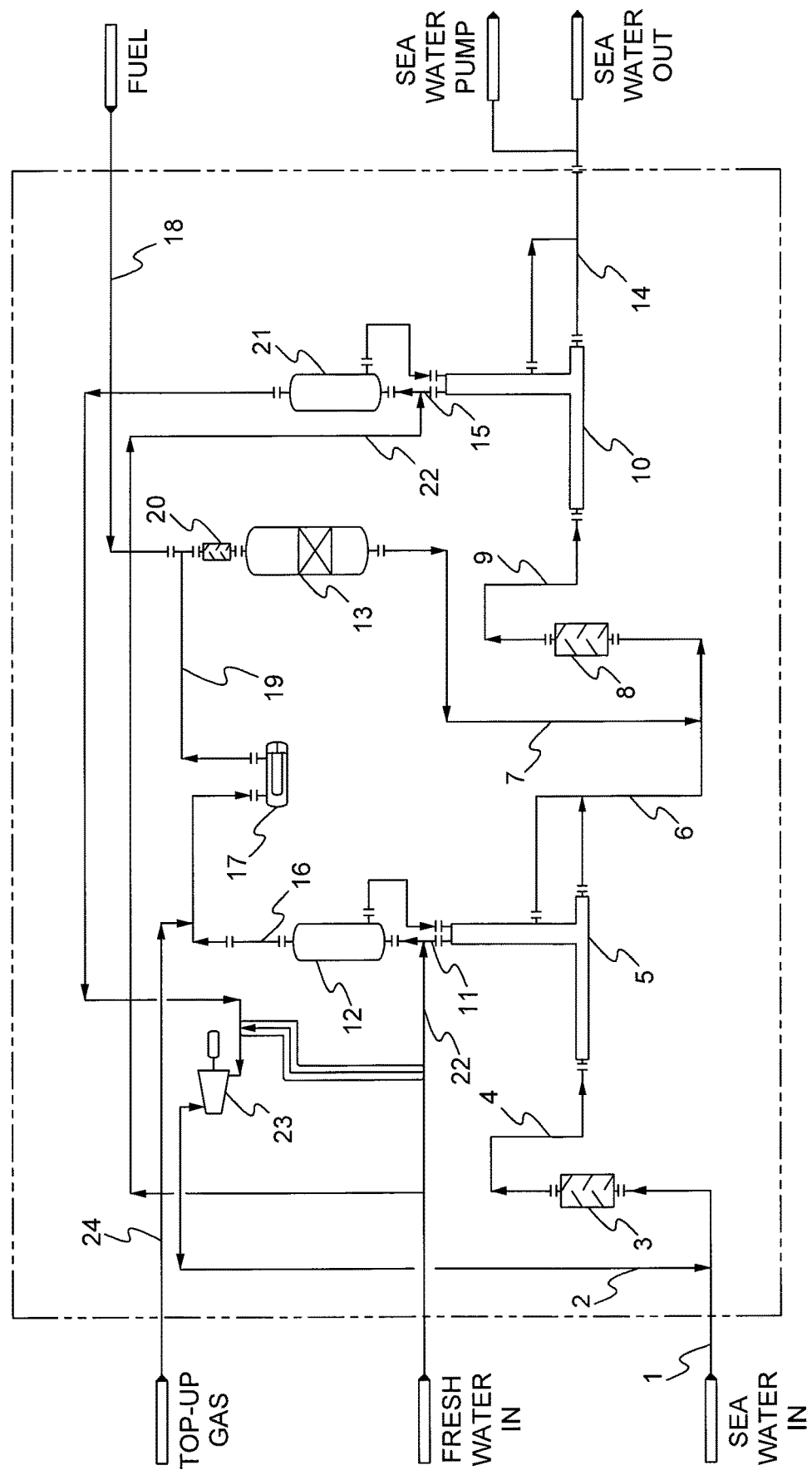

METHOD AND APPARATUS FOR REMOVAL OF OXYGEN FROM SEAWATER

Present invention relates to a method and apparatus for removal of oxygen from seawater according to the preamble of the independent claims.

TECHNICAL FIELD

Present invention relates to a method and apparatus for removal of dissolved oxygen in seawater to be injected under high pressure into an oil and/or gas reservoir for enhanced oil and/or gas recovery.

Oil and/or gas can be recovered from subsea reservoirs by means of the natural occurring pressure in the reservoir. Additional oil and/or gas can be received by injecting seawater in order to force more oil and/or gas out of the reservoir. In untreated seawater, there is dissolved oxygen, and this oxygen has to be removed in order to avoid corrosion problems in the equipment and also to reduce bacterial growth in the reservoir. The amount of oxygen dissolved in the seawater is temperature dependent.

BACKGROUND ART

Several methods and apparatuses for reduction of oxygen in seawater for injection into and oil and/or gas reservoirs are known.

Fuel gas stripping using a conventional counter-current gas/liquid contactor tower is a convenient method for reducing oxygen dissolved in seawater. However, this method requires a large tower and the apparatus has a large footprint. This method is inefficient for use at offshore platforms where space is at a minimum and weight of the equipment might be a serious problem. The used fuel gas must either be treated in a separate system or in many cases flared and by that have a negative effect on the environment.

Vacuum towers are used for separation of dissolved gases from liquids. Again, this method requires use of at least one large tower. Further, the method has high operating costs.

Oxygen scavengers injected into seawater react with the dissolved oxygen and thereby reduce the oxygen content. However, chemicals used as scavengers are expensive and significantly affect the cost of operating a seawater injection system. It also have a negative effect on most reservoirs (souring).

Some commercial designs of apparatus for regenerative nitrogen stripping of oxygen from seawater, such as the from the same applicant as present invention, Minox, described below, may allow for the use of less space than for either fuel gas stripping or vacuum tower methods, and the method incur lower costs than use of oxygen scavenging compounds. However, the use of the method requires incorporation of apparatuses and processes for remediation of operating problems that can arise, including, for example, foaming and entrainment that cause fouling of the downstream equipment, and so affect performance of the overall process. Another drawback with this method and apparatus is that use of conventional gravity separators result in a larger footprint and heavier weight than what can be achieved by present invention.

WO 2012/065243 describes a process and apparatus for reduction of dissolved oxygen in seawater by using a separator in horizontal alignment to provide high gas-liquid contacting area for separation and de-entrainment within the separator, and thereby provide a higher output. The first bed typically comprises multiple layers of high efficiency structures packing or random packing with high surface area per unit packing volume. The second bed preferably comprises a high void fraction structured packing or grid with lower surface area per unit packing volume. The seawater is heated to 30-60° C. to enhance removal of oxygen from the seawater and fuel gas is used as stripping gas. The stripping gas and entrained oxygen is combusted for heating the seawater. The stripping gas is used once in order to avoid operating problems arising from fouling of downstream equipment due to entrained salt.

U.S. Pat. No. 5,006,133 describe a method and apparatus in which a fuel including natural gas is used as both a stripping gas to remove oxygen from seawater and a fuel to be oxidized by said stripped oxygen in a catalytic process.

U.S. Pat. No. 5,612,021 describe a process for reduction of unwanted gas in a liquid by contacting with another gas. The second gas acts serves as a stripping gas, for example for reduction of oxygen in seawater by supplying nitrogen as said seawater is injected into a main gas ejector. In an auxiliary gas injector, positioned above the main gas injector, dissolution of entrained nitrogen displaces the oxygen dissolved in the seawater, which is then reacted in a catalytic burner. Make up nitrogen is then provided.

U.S. Pat. No. 4,752,306 describes a system in which an inert gas stripping gas is mixed in turbulent co-current flow with seawater to remove dissolved oxygen. The resulting gas mixture and liquid are separated, the gas mixture is then treated to remove oxygen, and the stripping gas is then returned to treat more seawater. A distinguishing feature of this process is that nitrogen is purified after use by removal of oxygen in a separate catalytic reaction chamber before recycling through the process.

NO158283 with the same applicant as present invention relates to a deoxygenation system comprising two gravitational separators and a catalytic reactor for reducing the oxygen content of seawater. The apparatus is compact and can be used at hazardous and non-hazardous locations through use of suitable enclosures. This system comprises a series of stages. Methanol is added to the effluent of the first stage stripping gas stream and the mixture of gases is heated over a catalyst so that the methanol reacts with oxygen to form carbon dioxide and water. The deoxygenated stripping gas is then returned to a second stage for further use. A problem that can occur with the recycle system of this type is that the catalyst and other equipment in the gas loop are prone to fouling from entrained saltwater.

US 20150283481 describes a type of inline separator where a fluid is passed through a tube element and the fluid is separated into light and heavy fluids. The heavier fluids are discharged to a vessel. A connection tube is coupled between the upper part of the vessel and the tube element to return the lighter fluid. The purpose of the inline separator is to remove e.g. water or separate the different constituents in a hydrocarbon mixture before further transport. This publication fails to describe use of in-line separators for separating stripping gas from seawater for subsequent injection of oxygen-depleted seawater into and oil or gas well.

NO20130670, U.S. Pat. No. 4,937,004, GB 2202167, GB 2127711, EP 458737, EP 391839, EP 327491, U.S. Pat. Nos. 4,612,021 and 4,565,634 relates similar methods and apparatus, but fail to describe use of inline separators in seawater deoxygenation systems, and injection of fresh water into the stripping gas to dilute amount of salt in the entrained seawater, to reduce salt deposits in the gas loop.

SUMMARY OF INVENTION

Present invention relates to a method and apparatus for catalytic removal of oxygen from seawater. One advantage of present invention is that the stripping gas is continuous circulated and the oxygen is removed by catalytic oxidation of a fuel that is added into the stripping gas circuit. Another advantage with the apparatus according to present invention is that the dimensions and footprint of the apparatus are reduced compared to the prior art solutions by using in-line separators instead of large, gravitational separators. A third advantage with the invention is that salt amount in seawater entrained with the stripping gas circuit is diluted by injection of fresh water.

These and other advantages are obtained by a method for catalytic removal of oxygen from seawater, which is characterized in that it comprises the following steps:

lead a stream of seawater to be treated and a pressurized stripping gas to a first mixer and mix the seawater with stripping gas;

lead the combined stream of seawater and stripping gas to a first gas/liquid inline separator and separate the stream into a liquid rich and a gas rich phase;

lead the liquid stream and a stripping gas stream containing $CO_2$ and water to a second mixer and mix the liquid stream with the gas stream;

lead the combined stream from the second mixer to a second stage gas/liquid inline separator and separate the combined stream into a liquid rich and a gas rich phase;

mix the gas stream from the first gas/liquid separator with a fresh water stream and lead this combined stream to a first stage scrubber and remove a major portion of the salt entrained in the combined stream from the scrubber;

lead the salt depleted gas stream from the first scrubber via a heat exchanger or electrical preheater together with a fuel stream to a catalytic deoxidizer and react the fuel and oxygen in the gas stream to form $CO_2$, $H_2O$ in the stripping gas stream and mixing this gas stream with the liquid stream from the first stage separator;

mix the gas stream from the second stage separator with fresh water to remove or dilute the entrained salt in the gas stream and lead the resulting gas stream to a compressor;

combine the salt depleted gas stream from the compressor and seawater to be treated.

Present invention also relates to an apparatus for removal of oxygen from seawater, where the apparatus comprises:

a first stage mixer for mixing seawater to be treated with a compressed stripping gas;

a first stage separator for separating the mixture from the first mixer into a gas stream and a liquid stream, a second stage mixer for mixing the liquid stream from the first stage separator with a gas stream from a subsequent processing step;

a second stage separator for separating the stream from the second stage mixer into a gas stream and an oxygen depleted seawater stream;

a first stage scrubber for removal of salt entrained in the gas stream from the first stage separator;

a heat exchanger or preheater for heating the gas stream from the first stage scrubber;

a third mixer for mixing the heated, gas stream from the heat exchanger or preheater with a stream of fuel;

a catalytic deoxidizer for catalytic deoxidizing of the stream from the mixer;

a compressor for compressing the gas stream from the second stage separator, which is characterized in that the first and second stage separators are in-line separators:
said apparatus comprises a second stage scrubber for diluting salt amount in seawater entrained in the gas stream from the second stage separator, and
a supply of fresh water is connected to the inlet of the compressor for diluting salt amount in seawater entrained in the gas fed to the compressor.

Further advantageous features are defined in the dependent claims.

BRIEF DESCRIPTION OF DRAWINGS

The invention will be further elaborated in the following description of preferred embodiments with reference to the accompanying drawings, where FIG. 1 is a flow sheet showing one embodiment of the system according to the invention.

DETAILED DESCRIPTION OF THE INVENTION

FIG. 1 shows a preferred embodiment of the system according to the invention. A seawater stream (1) to be deaerated is mixed with a stripping gas stream (2), for example, but not limited to nitrogen, circulated by a compressor or blower (23). This two-phase stream is led through a first stage static mixer (3), providing contact area and turbulent mixing, resulting in oxygen transfer from the liquid to the gas. Typical operating conditions for the static mixer (3) is a pressure of 3-10 barg and a temperature of 0-50° C. The mixed stream (4), containing water, stripping gas, oxygen and salt, is led to a first stage inline separator (5). The first stage inline separator (5) separates gas/water into gas phase (11) and liquid phase (6). Typical operating conditions for the separator (5) is a pressure of 2-10 barg and a temperature of 0-50° C. The gas stream from the inline separator (11) contains stripping gas, oxygen, some water, both vapour and entrained liquid droplets including salt residues. The liquid stream (6) contains water, salt and some oxygen remnants. Typically, 90-95% of the dissolved oxygen in the seawater will be removed in this first stage.

The gas stream (11) from the first stage in-line separator (5) is mixed with freshwater (22) to dilute salt concentration in the seawater entrained with the gas, before it is passed through a first stage scrubber (12) where the majority of the water and salt residues are removed. Typical operating conditions for this scrubber (12) is a pressure of 2-9 barg and a temperature of 0-50° C. The gas stream (16) is led to a heat exchanger or a pre-heater (17). In one embodiment of the invention, this preheater (17) is an electrical per-heater, while in an alternative embodiment, this pre-heater (17) is a heat exchanger where the cold gas stream is heated by a reaction gas stream from a subsequent deoxidiser (13). A fuel (18) is injected into the heated gas stream (19) before it is led through a static mixer (20), and then to the deoxidiser (13). The fuel can typically be methanol, ethanol, hydrogen or natural gas. The oxygen in the gas stream (19) reacts with the fuel (18) across a catalytic bed in the deoxidiser (13). Product from the chemical reaction (7) is water, and sometimes $CO_2$ and CO, depending on fuel (18) used. This reaction is exothermic and for this reason, the heat developed through the reaction may be conserved by optionally recycling the hot gas (7) from the deoxidiser (13) through the heat exchanger (17) used for pre-heating the cold stripping gas (16) upstream of the deoxidiser (13). This option is not shown in the drawing. The operating conditions for the deoxidiser are typically a pressure of 2-9 barg and a temperature of 140-550° C.

The liquid stream (6) from the first stage in-line separator (5) is mixed with the circulating stripping gas stream (7) from the deoxidiser (13). This two-phase stream is led through a second stage static mixer (8) providing contact area and turbulent mixing, resulting in more oxygen transfer from the liquid to the gas. The mixed stream (9) is led to a second stage inline separator (10). This second inline separator (10) separates gas/water into liquid phase (14) of deaerated seawater, and a gas phase (15) containing less oxygen than the gas stream from the first stage (11). Typically will the remaining 5-10% of the initial oxygen be removed in this second stage. The operating conditions for this second in-line separator (10) is a pressure of 1-9 barg and a temperature of 0-50° C. The deaerated seawater (14) from the second in-line separator (10) can be used for injection into gas and/or oil reservoirs.

The gas stream (15) from the second in-line separator (10) is mixed with fresh water (22) to dilute salt concentration in the seawater entrained with the gas, before it is passed through a second stage scrubber (21) where the majority of the water is removed. The scrubber may be omitted if the compressor/blower (23) can tolerate small amounts of liquid in the gas flow, then fresh water can be injected right upstream of the compressor. The gas stream is circulated by a compressor/blower (23) back to the first stage of the deaeration process, mixing the compressed gas flow (2) with the incoming flow of seawater (1). As the system is pressurized, the outlet water (14) is saturated by a small amount of stripping gas. This loss of stripping gas must be compensated for by use of a top-up gas (24), typically, but not limited to nitrogen or air.

The invention claimed is:

1. A method for removal of oxygen from seawater, the method comprising:

leading a stream of seawater to be treated and a pressurized first stripping gas to a first mixer and mixing the seawater with said first stripping gas and forming a first combined stream;

leading the first combined stream of seawater and said first stripping gas to a first gas/liquid inline separator and separating the first combined stream into a first liquid rich and a first gas rich phase;

leading the first liquid rich phase and a second stripping gas stream containing $CO_2$ and water to a second mixer and mixing the liquid rich phase with the second stripping gas stream and forming a second combined stream;

leading the second combined stream from the second mixer to a second stage gas/liquid inline separator and separating the second combined stream into a second liquid rich phase and a second gas rich phase;

mixing the first gas rich phase from the first gas/liquid separator with a fresh water stream and leading this combined stream to a first stage scrubber and removing a major portion of the salt entrained in the combined stream from the scrubber;

leading the salt depleted gas stream from the first scrubber via a heat exchanger or electrical preheater together with a fuel stream to a catalytic deoxidizer and reacting the fuel and oxygen in the gas stream to form $CO_2$ and $H_2O$ in the stripping gas stream and mixing this gas stream with the liquid stream from the first stage separator;

mixing the gas stream from the second stage separator with fresh water to remove or dilute the entrained salt in the gas stream and leading the resulting gas stream to a compressor; and combining the salt depleted gas stream from the compressor and seawater to be treated.

2. The method according to claim 1, wherein salt amount in seawater entrained in the gas stream from the second separator is removed by mixing the gas stream with fresh water and separating this mixture into a salt depleted gas stream and a liquid stream in a second scrubber.

3. The method according to claim 1, wherein salt entrained in the gas stream from the second stage separator is diluted by injecting fresh water before the gas stream is led to the compressor.

4. The method according to claim 1, wherein the first and second stage separators are in-line separators.

5. The method according to claim 1, wherein the stripping gas is Nitrogen ($N_2$).

6. The method according to s claim 1, wherein the fuel is hydrogen, natural gas, methanol, ethanol or mixtures of any of these.

7. The method according to claim 1, wherein 90-95% of the oxygen in the seawater to be treated is removed in the first stage separator.

8. An apparatus for removal of oxygen from seawater, the apparatus comprising:

a first stage mixer for mixing seawater to be treated with a compressed stripping gas;

a first stage separator for separating the mixture from the first mixer into a gas stream and a liquid stream;

a second stage mixer for mixing the liquid stream from the first stage separator with a gas stream from a subsequent processing step;

a second stage separator for separating the stream from the second stage mixer into a gas stream and an oxygen depleted seawater stream;

a first stage scrubber for removal of salt entrained in the gas stream from the first stage separator;

a heat exchanger or preheater for heating the gas stream from the first stage scrubber;

a third mixer for mixing the heated gas stream from the heat exchanger or preheater with a stream of fuel;

a catalytic deoxidizer for catalytic deoxidizing of the stream from the mixer; and a compressor for compressing the gas stream from the second stage separator;

wherein:

the first and second stage separators are in-line separators; the apparatus comprises a second stage scrubber for diluting salt amount in seawater entrained in the gas stream from the second stage separator; and a supply of fresh water is connected to the inlet of the compressor for diluting salt amount in seawater entrained in the gas fed to the compressor.

* * * * *